US008700480B1

(12) United States Patent
Fox et al.

(10) Patent No.: US 8,700,480 B1
(45) Date of Patent: Apr. 15, 2014

(54) EXTRACTING QUOTES FROM CUSTOMER REVIEWS REGARDING COLLECTIONS OF ITEMS

(75) Inventors: Eric B. Fox, Seattle, WA (US); Logan L. Dillard, Seattle, WA (US); Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 241 days.

(21) Appl. No.: 13/164,181

(22) Filed: Jun. 20, 2011

(51) Int. Cl.
*G06Q 30/00* (2012.01)

(52) U.S. Cl.
USPC ............... 705/26.1; 705/26.7; 705/27.1

(58) Field of Classification Search
USPC ...................... 705/26.1, 27.1, 26.7
See application file for complete search history.

(56) References Cited

U.S. PATENT DOCUMENTS

| | | | |
|---|---|---|---|
| 7,620,651 B2 * | 11/2009 | Chea et al. | 707/750 |
| 7,660,749 B2 | 2/2010 | Koski | |
| 7,739,261 B2 | 6/2010 | Zeng et al. | |
| 7,930,302 B2 | 4/2011 | Bandaru et al. | |
| 8,554,701 B1 | 10/2013 | Dillard et al. | |
| 2006/0129446 A1* | 6/2006 | Ruhl et al. | 705/10 |
| 2006/0224962 A1 | 10/2006 | Ostojic et al. | |
| 2008/0082499 A1* | 4/2008 | Koski | 707/3 |
| 2008/0249764 A1 | 10/2008 | Huang et al. | |
| 2009/0063247 A1* | 3/2009 | Burgess et al. | 705/10 |
| 2009/0265307 A1 | 10/2009 | Reisman et al. | |
| 2010/0169317 A1 | 7/2010 | Wang et al. | |
| 2011/0099133 A1 | 4/2011 | Chang et al. | |
| 2011/0112995 A1 | 5/2011 | Chang et al. | |
| 2011/0184729 A1 | 7/2011 | Nam | |
| 2012/0078918 A1 | 3/2012 | Somasundaran et al. | |
| 2012/0123992 A1 | 5/2012 | Randall | |

OTHER PUBLICATIONS

U.S. Appl. No. 13/097,233, filed Apr. 29, 2011, Fox et al.
U.S. Appl. No. 13/051,278, filed Mar. 18, 2011, Dillard et al.
U.S. Notice of Allowance/Allowability dated Jun. 20, 2013 in U.S. Appl. No. 13/051,309 filed Mar. 18, 2011, First Named Inventor: Logan L. Dillard.
U.S. Official Action dated Jun. 20, 2013 in U.S. Appl. No. 13/097,233 filed Apr. 29, 2011, First Named Inventor: Eric B. Fox.
U.S. Official Action dated Aug. 28, 2013 in U.S. Appl. No. 13/051,278 filed Mar. 18, 2011, First Named Inventor: Logan L. Dillard.

(Continued)

*Primary Examiner* — Courtney Stopp
(74) *Attorney, Agent, or Firm* — Hope Baldauff, LLC

(57) ABSTRACT

Technologies are described herein for extracting quotes from customer reviews regarding collections of items. An identifier of an individual item is received and customer reviews regarding a collection of items containing the individual item are retrieved. A collection of sentences is parsed from the retrieved customer reviews, and sentences that discuss the individual item are identified. A quote is extracted from the identified sentences and displayed to a customer in conjunction with information regarding the individual item. Similarly, individual items belonging to a collection of items are identified, and customer reviews regarding the individual items are retrieved. A collection of sentences are parsed from the retrieved customer reviews, and those sentences that discuss topics relevant to the collection of items are identified. A number of quotes are extracted from the identified sentences and displayed to a customer in conjunction with information regarding the collection of items.

22 Claims, 6 Drawing Sheets

(56) References Cited

OTHER PUBLICATIONS

Clarke, J. "Clustering Techniques for Multi-document Summarisation" MSc Advanced Computer Science, University of Sheffield, Aug. 15, 2004, [online][retrieved on Aug. 20, 2013] retrieved from: http://www.dcs.shef.ac.uk/intranet/teaching/public/projects/archive/msc2004/pdf/m3jc2.pdf, pps. 1-55.
Erkan, G. "LexRank: Graph-based Lexical Centrality as Salience in Text Summarization" Journal of Artificial Intelligence Research, vol. 22, Issue 1, Jul. 2004, pp. 457-479.
Khang, L. "Product Review Summarization from a Deeper Perspective" Department of Computer Science, School of Computing, National University of Singapore, May 11, 2010, pp. 1-46.
Garcia-Fernandez, R. "Text Summarization by Sentence Extraction Using Unsupervised Learning", 7th Mexican International Conference on Artificial Intelligence, Atizapan de Zaragoza, Mexico, Oct. 27-31, 2008, Advances in Artificial Intelligence Lecture Notes in Computer Science, vol. 5317, 2008, pp. 133-143.
Pang, B. "Thumbs up? Sentiment Classification Using Machine Learning Techniques", Association for Computational Linguistics 2002, Proceedings of the ACL-02 Conference on Empirical Methods in Natural Language Processing, vol. 10, 8 pp.
Kim, S. "Determining the Sentiment of Opinions", Association for Computational Linguistics, Proceedings of the 20th International Conference on Computational Linguistics, 2004, 7 pp.
Hu, M. "Mining and Summarizing Customer Reviews", 2004, ACM, Proceedings of the Tenth ACM SIGKDD International Conference on Knowledge Discovery and Data Mining, pp. 168-177.
Tang, H. "A Survey on Sentiment Detection of Reviews", 2009, Elsevier, Expert Systems with Applications 36, pp. 10760-10773.
Koppel, M. "The Importance of Neutral Examples for Learning Sentiment", 2006, Computational Intelligence 22, No. 2, 9 pps.
Ku, L. "Using Polarity Scores of Words for Sentence-level Opinion Extraction", 2007, Proceedings of NTCIR-6 Workshop Meeting, 7 pps.
Ku, L. "Opinion Extraction, Summarization and Tracking in News and Blog Corpora", 2006, AAAI, Proceedings of AAAI-2006 Spring Symposium on Computational Approaches to Analyzing Weblogs, vol. 2001, 8 pps.
Chen, E. "Edwin Chen's Blog" [online][retrieved on Jun. 17, 2013] retrieved from http://blog.echen.me/2011/08/22/introduction-to-latent-dirichlet-allocation/, 9 pps.
U.S. Official Action dated Jan. 7, 2014 in U.S. Appl. No. 13/097,233, filed Apr. 29, 2011, First Named Inventor: Eric B. Fox.

\* cited by examiner

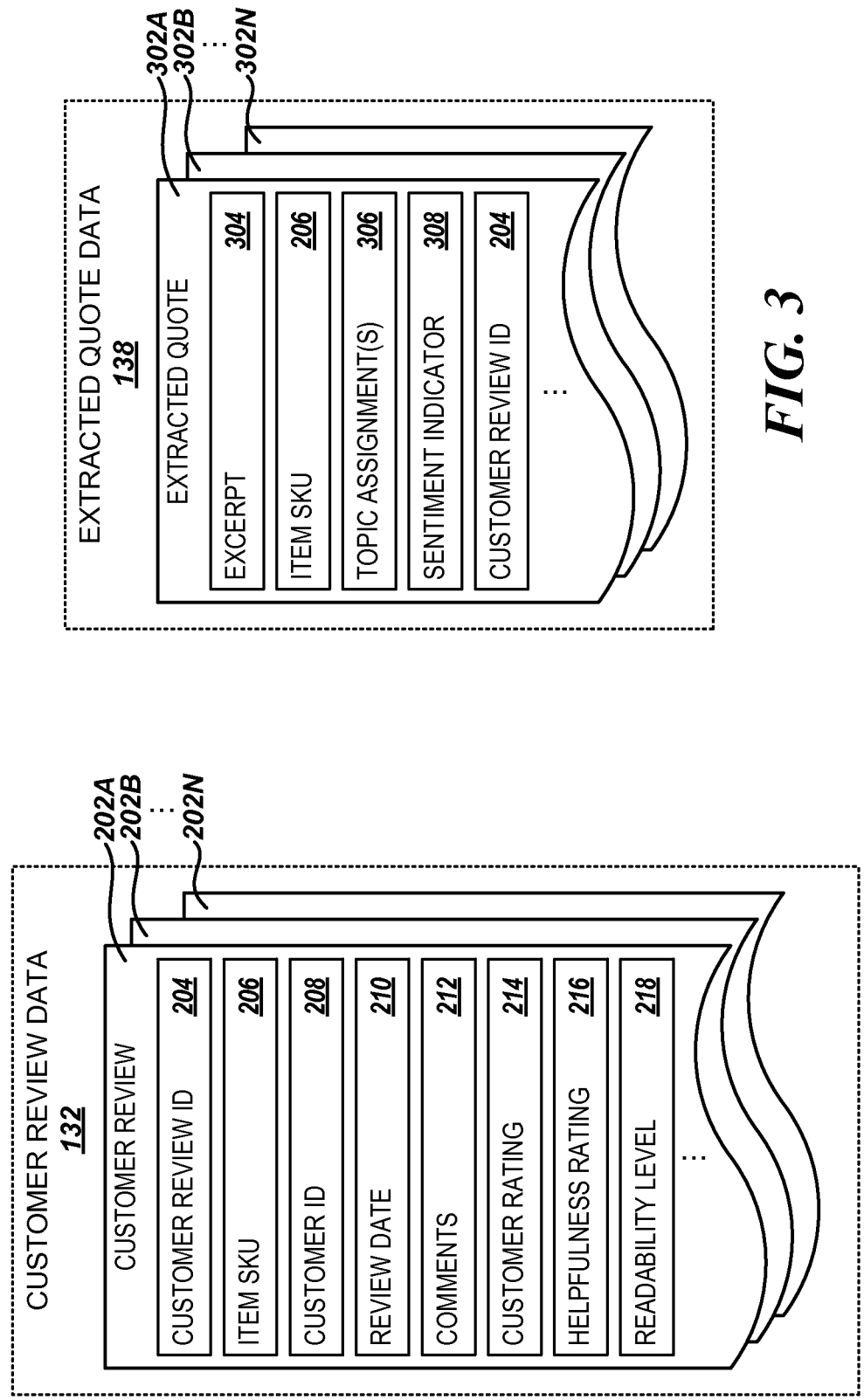

EXTRACTING QUOTES FROM CUSTOMER REVIEWS REGARDING COLLECTIONS OF ITEMS

BACKGROUND

An online merchant may provide a large number of items for sale to customers over the Internet. Customers may access information regarding the available items through a website or other information service provided by the online merchant. The information regarding the items may include that information needed by the customer to identify and purchase a particular item, such as the name of the item, a picture of the item, the price and availability of the item, and a mechanism for initiating the purchase of the item. In order to enhance the online shopping experience and allow the customer to fully research a particular item, the online merchant may provide additional item information along with the purchase information. The additional item information may include a detailed description of the item, a list of features, technical specifications, as well as customer reviews of the item. The customer reviews may allow a potential purchaser to evaluate what other customers think about the item. The customer reviews may include a quantitative rating of the item as well as comments regarding the customer's experience and satisfaction with the item.

While the online merchant may wish to provide a similar shopping experience across all available items, the amount of additional item information available for different types of items may vary. For example, the items offered by the online merchant may include media products, including physical media, such as CDs, DVDs, and the like, as well as digital media available for download from the online shopping website, such as MP3 audio tracks. Because physical media sales may pre-date digital media sales and/or because of the difference in the ways customers shop for physical media versus digital media, there may be many more customer reviews available for physical media items than for the related digital media. For example, for a particular album of music, there may be many more customer reviews regarding a CD of the album than for the digital download of the album.

Further, while customer reviews from the CD may be salient for a customer wishing to purchase and download the entire album, the overall customer reviews may not be relevant to a purchaser of an individual track from the album, even when some of the reviews contain comments discussing the particular track. Similarly, sales of an individual item, such as a battery-operated drill, may outpace sales of a product set including the individual item, such as a tool set that includes the battery-operated drill along with several other matching battery-operated power tools. However, many of the comments made in customer reviews for the battery-operated drill may be of interest to potential purchasers of the tool set, such as comments regarding battery life, quality of the brand, and the like.

It is with respect to these and other considerations that the disclosure made herein is presented.

BRIEF DESCRIPTION OF THE DRAWINGS

FIG. 2 is a data structure diagram illustrating a number of data structures and elements maintained in customer review data, according to embodiments presented herein;

FIG. 3 is a data structure diagram illustrating a number of data structures and elements maintained in extracted quote data, according to embodiments presented herein;

DETAILED DESCRIPTION

Figure 1:
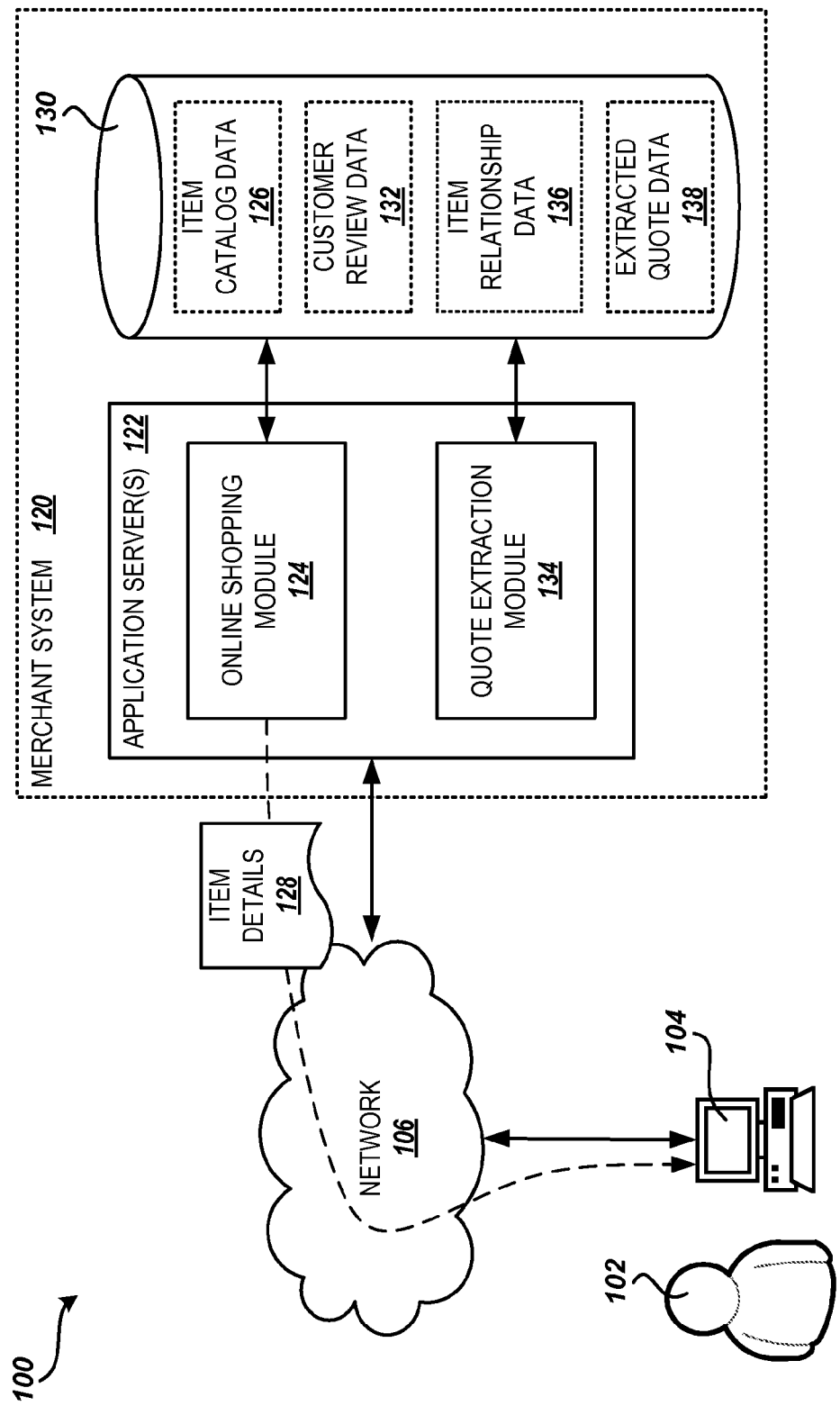
FIG. 1 is a system diagram showing aspects of an illustrative operating environment for extracting quotes from customer reviews regarding collections of items, including several software and hardware components provided by embodiments presented herein.

The following detailed description is directed to technologies for extracting quotes from customer reviews regarding collections of items. Utilizing the technologies described herein, an online merchant may extract salient quotes regarding an individual item from customer reviews regarding a group or collection of items that includes the individual item. In addition, the online merchant may further extract quotes from the customer reviews of individual items that are relevant to a group or collection of items, such as a product set that includes the individual items and is sold together as a unit. By performing the quote extraction methods described herein, the online merchant may leverage the content of available customer reviews for a broader range of items and product sets in the online catalog, providing a richer shopping experience for potential customers of these items and collections of items.

According to embodiments, an identifier of an individual item is received and customer reviews regarding collection(s) of items containing the individual item are retrieved. A collection of sentences is parsed from the retrieved customer reviews, and those sentences in the collection of sentences that discuss the individual item are identified. At least one quote is extracted from the identified sentences and displayed to a customer in conjunction with information regarding the individual item. Similarly, individual items belonging to a collection of items are identified, and customer reviews regarding the individual items are retrieved from customer review data. A collection of sentences are parsed from the retrieved customer reviews, and those sentences that discuss topics relevant to the collection of items are identified. A number of quotes are extracted from the identified sentences and are displayed to a customer in conjunction with information regarding the collection of items.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for extracting quotes from customer reviews regarding collections of items. The environment 100 includes a customer 102 that uses a customer computer 104 to access a merchant system 120 across a network 106. The customer 102 may be an individual or entity that desires to purchase one or more items from the online merchant. The customer computer 104 may be a personal computer ("PC"), a desktop workstation, a laptop, a notebook, a personal digital assistant ("PDA"), an electronic-book reader, a game console, a set-top box, a consumer electronics device, a server computer, or any other computing device capable of connecting to the network 106 and communicating with the merchant system 120.

The network 106 may be a local-area network ("LAN"), a wide-area network ("WAN"), the Internet, or any other networking topology known in the art that connects the customer computer 104 to the merchant system 120. The merchant system 120 may include a number of application servers 122 that provide various online shopping services to the customer computer 104 over the network 106. The customer 102 may use a client application executing on the customer computer 104 to access and utilize the online shopping services provided by the application servers 122. According to one embodiment, the client application may be a web browser application, such as the MOZILLA® FIREFOX® web browser from Mozilla Foundation of Mountain View, Calif. The web browser application exchanges data with the application servers 122 in the merchant system 120 using the hypertext transfer protocol ("HTTP") over the network 106. Alternatively, the client application may utilize any number of communication methods known in the art to communicate with the merchant system 120 and/or the application servers 122 across the network 106, including remote procedure calls, SOAP-based web services, remote file access, proprietary client-server architectures, and the like.

The application servers 122 may execute a number of modules in order to provide the online shopping services to the customer computer 104. The modules may execute on a single application server 122 or in parallel across multiple application servers in the merchant system 120. In addition, each module may consist of a number of subcomponents executing on different application servers 122 or other computing devices in the merchant system 120. The modules may be implemented as software, hardware, or any combination of the two.

According to one embodiment, an online shopping module 124 executes on the application servers 122. The online shopping module 124 may retrieve information regarding a particular item, product set, or other collection of items offered for sale by the online merchant from item catalog data 126, generate item details 128 containing the item information, and transmit the item details 128 over the network 106 to the client application for display to the customer 102. The item catalog data 126 may be stored in a datastore 130, such as a database or other storage mechanism available to the application servers 122 in the merchant system 120. The item catalog data 126 may contain information regarding each item or collection of items offered for sale by the merchant. The item catalog data 126 may further contain information utilized to organize the items and facilitate searching, browsing, and purchasing of the items by the customer 102.

The item details 128 may be contained in a web page consisting of hypertext markup language ("HTML"), extensible markup language ("XML"), JavaScript object notation ("JSON"), and the like that contains the item information along with instructions regarding how the item details 128 are to be displayed on the customer computer 104. It will be appreciated that any number of methods and technologies may be utilized that allow the online shopping module 124 to encode the item information in the item details 128 and send the item details to the customer computer 104 for display to the customer 102.

According to embodiments, the item details 128 containing the item information include customer reviews. Customer reviews of individual items may be provided by customers 102 through the online shopping module 124, for example. The customer reviews may include a quantitative rating of the item, comments regarding the item, information regarding the reviewer, and the like, as will be described in more detail below in regard to FIG. 2. The customer reviews regarding the item may be retrieved by the online shopping module 124 from customer review data 132 maintained in the merchant system 120. For example, the customer review data 132 may be stored in the datastore 130 or other data storage mechanism available to the online shopping module 124.

As described above, the availability and/or quantity of customer reviews available in the customer review data 132 may be different for different types of items, product sets, and/or collections available in the item catalog data 126. For example, there may be many more customer reviews in the customer review data 132 available for physical media items than for the related digital media. Thus for a particular album of music, there may be many more customer reviews regarding a CD containing the album than for the digital download of the album or the individual tracks. Further, while the customer reviews for the CD in the customer review data 132 may be salient for a customer 102 wishing to purchase and download the entire album, the overall customer reviews may not be relevant to a purchaser of an individual track from the album, even when some of the reviews contain comments discussing the particular track.

Similarly, there may be many customer reviews in the customer review data 132 regarding particular items that customers often buy and review individually, but are also sold in product sets or have a branded commonality, such as tools, cutlery sets, cookware, and the like. For example, the customer review data 132 may include customer reviews for an individual battery-operated drill from a particular manufacturer. While many of the topics discussed in these customer reviews may be applicable only to the drill, such as variable speed and available drill bits, the customer reviews may contain discussion of topics that are applicable to several battery-operated tools from the manufacturer, such as battery life, recharging time, overall quality, and the like. These discussions in the customer reviews may be of interest to a customer desiring to purchase a set of battery-operated tools that includes the drill, or another battery-operated tool from the manufacturer.

In one embodiment, a quote extraction module 134 executes on the application servers 122. The quote extraction module 134 may periodically scan customer reviews in the customer review data 132 in order to extract salient comments or "quotes" for related items. For example the quote extraction module 134 may scan the customer review data 132 in order to extract quotes or comments regarding an individual item, such as an MP3 audio track, from customer reviews of a collection of items containing the item, such as CDs and other media containing the track. The quote extraction module 134 may further scan the customer review data 132 in order to extract quotes or comments regarding a collection of items, such as a product set containing a number of battery-operated tools, from customer reviews of individual items included in the product set, such as an individual battery-operated drill, saw, screwdriver, and the like from the same manufacturer.

It will be appreciated that the quote extraction module 134 extracts salient quotes from customer reviews of items or collections of items that are applicable to other items, product sets, or collections through other relationships. For example the quote extraction module 134 extracts quotes regarding a particular episode of a TV series from customer reviews of a collection of DVDs containing a particular season of the TV series, a specific movie from a box set of BLU-RAY® movies, a collection of cookware from customer reviews of individual pans, an individual digital camera from customer reviews regarding other digital cameras from the same manufacturer, and the like. According to embodiments, the quote extraction module 134 may utilize a methodology such as those described below in regard to FIGS. 4 and 6 to extract quotes or comments regarding the related items from the customer reviews in the customer review data 132.

In order to determine the relationship between items and/or collections of items, the quote extraction module 134 may utilize item relationship data 136 stored in the datastore 130 or other storage mechanism in the merchant system 120. For example, the item relationship data 136 may include track to album mappings in order to determine the album(s) on which a particular track appears. The quote extraction module 134 may then scan the customer review data 132 for customer reviews related to those albums containing the track in order to find salient quotes regarding the track. It will be appreciated that the item relationship data 136 may contain relationships between other individual items and collections of items as well, such as an individual episode of a TV series available for streaming and a DVD collection containing an entire season of the TV series, a battery-operated drill and a tool set that includes the drill, a lens and a camera set that includes the lens, a frying pan and a set of cookware that includes the frying pan, and the like.

In addition, the item relationship data 136 may contain title authority sets that describe various media items available in the item catalog data 126 that are related to those albums containing the individual track. For example a particular album may be available in the item catalog data 126 in a variety of physical formats as well as in special edition releases. The quote extraction module 134 may utilize the track to album mappings to find one or more albums containing the track, and reference the title authority sets in the item relationship data 136 to determine all items available for sale in the item catalog data 126 that embody those albums. The quote extraction module 134 may then retrieve customer reviews from the customer review data 132 for all items related to the individual track in order to extract quotes regarding that track.

In another example a particular TV series may be available in the item catalog data 126 as a collections of DVDs for an individual season as well as in box sets containing episodes from a number of seasons. The quote extraction module 134 may utilize the various collections of physical media and digital media for the TV series and the relationship(s) between them stored in the relationship data 136 to determine items available for sale in the item catalog data 126 that contain an individual episode of the TV series. It will be further appreciated that the item relationship data 136 may represent information contained in the item catalog data 126 or other dataset.

According to one embodiment, the extracted quotes may be stored as extracted quote data 138 in the datastore 130 or other storage mechanism in the merchant system 120. The online shopping module 124 may retrieve the extracted quotes for a particular item, product set, or related collection of items from the extracted quote data 138 and include the quotes in the item details 128 presented to the customer 102 in lieu of or in conjunction with the customer reviews for the item or collection of items. In another embodiment, the extracted quotes may be placed back in the customer review data 132 as individual customer reviews associated with the particular item, product set, or collection, as will be further described below.

FIGS. 2 and 3 are data structure diagrams showing a number of data elements stored in data structures. It will be appreciated by one skilled in the art that data structures shown in the figure may represent rows in a database table, instances of objects stored in a computer memory, programmatic structures, or any other data container commonly known in the art. Each data element included in the data structure may represent one or more fields or columns of a database table, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

FIG. 2 shows one example of data maintained in the customer review data 132, according to embodiments. As described above, the customer review data 132 may contain customer reviews 202A-202N (referred to herein generally as customer review 202) regarding a specific item or product set offered for sale in the item catalog data 126. For example, the customer review data 132 may contain multiple customer reviews 202 regarding a particular CD or a particular MP3 audio track provided by customers 102 of the merchant system 120. According to one embodiment, the customer review data 132 may contain customer reviews 202 containing quotes and comments extracted by the quote extraction module 134 from customer reviews of related items or collections of items.

Each customer review 202 contains a customer review ID 204 that allows individual customer reviews to be uniquely identified and distinguished by the online shopping module 124, the quote extraction module 134, and other modules or applications in the merchant system 120. Each customer review 202 also contains an identifier of the associated item or collection of items in the item catalog data 126 to which the customer review applies, such as an item stock-keeping unit ("SKU") 206 shown in FIG. 2. The item SKU 206 may be utilized by the online shopping module 124 to select the relevant customer reviews 202 to include in the item details 128 presented to the customer 102 on the customer computer 104 regarding the particular item or collection of items.

Each customer review 202 may also contain a customer ID 208 that identifies the customer 102 or other user that provided the customer review. The customer ID 208 may consist of a user ID, a customer number, a customer name, a handle, an email address, an IP address of a Web browser, or any combination of these and other information that may uniquely identify a particular customer 102 or user of the merchant system 120. A customer handle, location, and/or other information regarding the customer providing the review may be presented with each customer review 202 shown by the online shopping module 124, for example. Each customer review 202 may also include a review date 210 indicating when the customer review was created.

According to embodiments, each customer review 202 also contains comments 212. The comments 212 may include free form text provided by the customer 102 regarding the associated item or collection of items. It will be appreciated that the comments 212 may include one or more sentences regarding any information directly or indirectly related to the associated item. For example, in a customer review 202 regarding a CD, the comments 212 may contain sentences related to the type of music contained on the album, individual tracks on the album, the source of the album's tracks, other tracks or albums by the same artist, production quality of the recording, the artist's lifestyle or behaviors, and the like. As will be described further below, the comments 212 may include the quotes or individual sentences extracted by the quote extraction module 134 from the customer reviews 202 for other, related items or collections of items.

Each customer review 202 may further contain attributes that allow customers 102 to evaluate the review itself and its applicability to the associated item, as well as allow the online shopping module 124 to select the most salient customer reviews 202 to include in the item details 128 presented to the customer 102. For example, each customer review 202 may include a customer rating 214 that provides a quantitative evaluation of the associated item. The customer rating 214 may be a number from a range of numbers indicating the overall satisfaction of the customer 102 with the associated item. Each customer review 202 may also include a helpfulness rating 216. The helpfulness rating 216 may indicate whether other customers 102 of the merchant system 120 find the comments 212 in the customer review 202 helpful or not, based on feedback supplied by the other customers.

In one embodiment, each customer review also includes a readability level 218. The readability level 218 may indicate the readability of the associated comments 212, based on grammar, word usage, average word length, average number of syllables per word, and the like. The readability level 218 for the comments 212 of a customer review 202 may be established by an offline-analysis of supplied customer reviews, such as the periodic processing of the quote extraction module 134 described herein. It will be appreciated that additional data elements may be maintained in the customer review data 132 for each customer review 202 beyond those described herein, and that not every data element or attribute described will be available for every customer review 202 in the customer review data 132.

FIG. 3 shows one example of data maintained in the extracted quote data 138, according to embodiments. As described above, the extracted quote data 138 may contain extracted quotes 302A-302N (referred to herein generally as extracted quote 302) extracted by the quote extraction module 134 from the customer review data 132. Each extracted quote 302 contains an excerpt 304 comprising a text-based comment from a customer review 202. The excerpt 304 may contain one or more representative sentences or phrases extracted from customer reviews 202 for an item or collection of items that summarizes the information contained in the customer reviews for the item or collection of items, both as to content and sentiment. Each extracted quote 302 may further contain an item SKU 206 identifying the item or collection of items to which the excerpt 304 applies. The item SKU 206 may be utilized by the online shopping module 124 to select the relevant extracted quotes 302 to present to the customer 102, as will be described in more detail below.

According to embodiments, each extracted quote 302 may also contain topic assignment(s) 306 and a sentiment indicator 308. As will be further described below in regard to FIG. 6, the topic assignment(s) 306 may indicate one or more general topics regarding the item or collection of items to which the sentence(s) in the excerpt 304 are directed, while the sentiment indicator 308 may provide an indication of the sentiment expressed by the excerpt. The topic assignment(s) 306 and sentiment indicator 308 for the extracted quote may be established by the quote extraction module 134 in the quote extraction process. The online shopping module 124 may further utilize the topic assignment(s) 306 and/or the sentiment indicator 308 to select the particular extracted quotes 302 to present to the customer 102 along with the item details 128.

Each extracted quote 302 may also contain the customer review ID 204 identifying the original customer review 202 from which the excerpt 304 was extracted. The online shopping module 124 may utilize the customer review ID 204 to retrieve information from the original customer review 202 that may be presented with the extracted quote 302, such as an identity or handle of the posting customer, the date the customer review was posted, the overall customer rating 214 from the review, the helpfulness rating 216 given the review, and the like. It will be appreciated that additional data elements may be maintained in the extracted quote data 138 for each extracted quote 302 beyond those described herein, and that not every data element described will be available for every extracted quote 302 in the extracted quote data 138.

Figure 4:
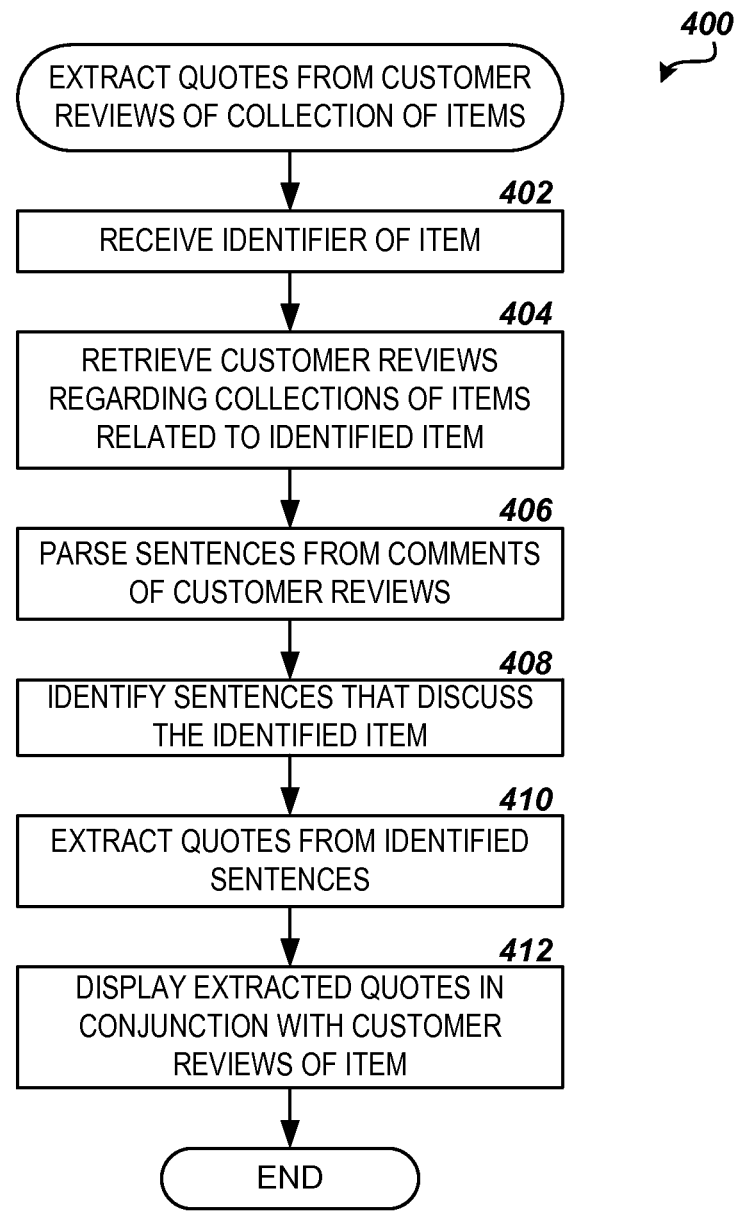
FIG. 4 is a flow diagram showing a method of extracting quotes regarding an individual items from customer reviews of collections of items containing the individual item, according to embodiments described herein.
Figure 6:
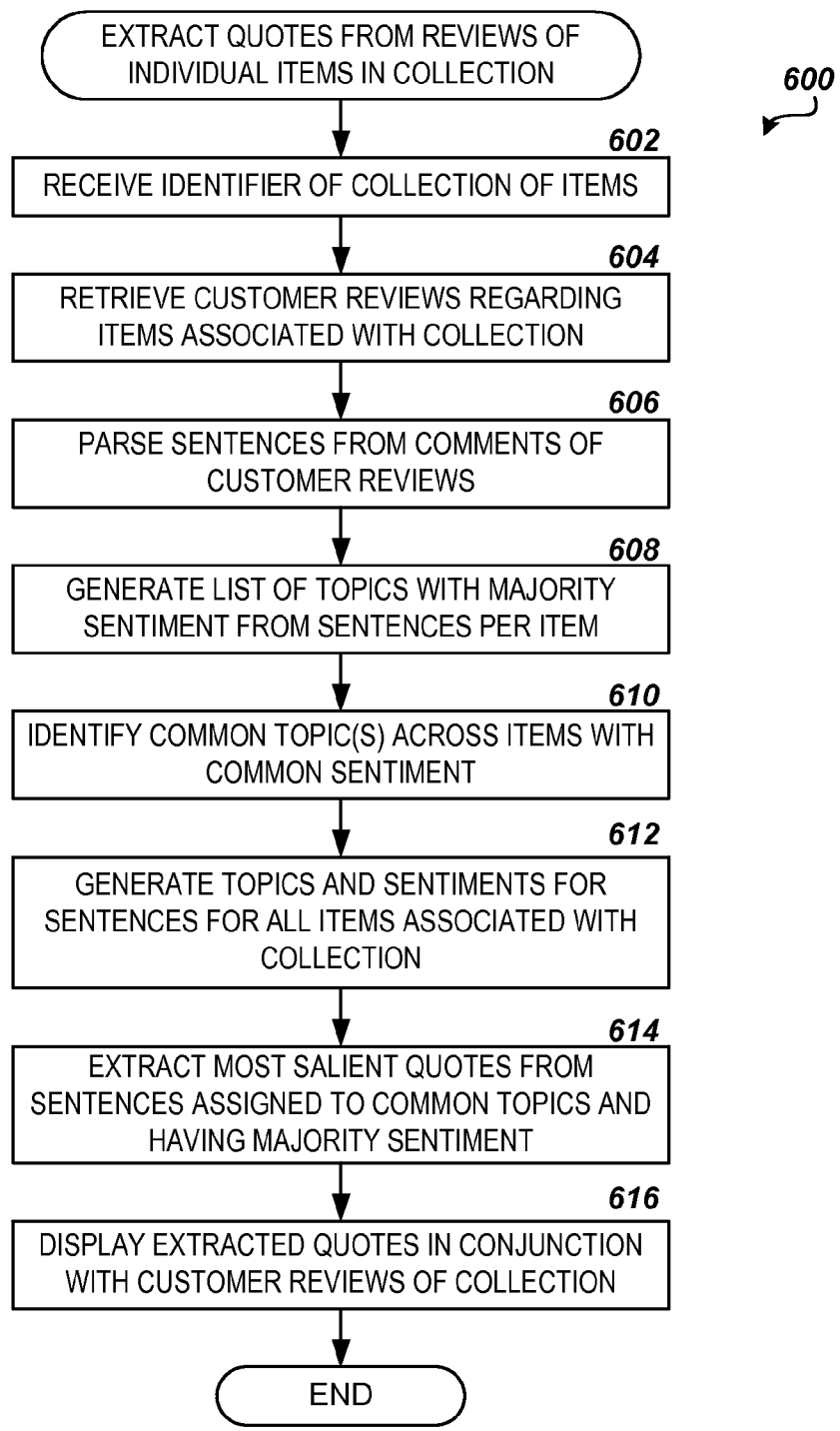
FIG. 6 is a flow diagram showing a method of extracting quotes regarding a product set from customer reviews of individual items in the product set, according to embodiments described herein.

Turning now to FIGS. 4 and 6, additional details will be provided regarding the embodiments described herein for extracting quotes from customer reviews regarding collections of items. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for extracting quotes from customer reviews 202 regarding a collection of items containing a particular item, according to one embodiment described herein. For example, the routine 400 may be used to extract quotes regarding an individual audio track from customer reviews 202 regarding CDs, albums, and other media collections containing the track. Similarly, the routine 400 may be used to extract quotes regarding an individual book from customer reviews regarding a box set of books, an individual movie from customer reviews regarding movie trilogy, an individual tool from customer reviews regarding a tool set, a camera lens from customer reviews regarding a DSLR camera package, and the like. The routine 400 may be performed by the quote extraction module 134, as described above in regard to FIG. 1. It will be appreciated that the routine 400 may also be performed by other modules or components executing on the application servers 122 in the merchant system 120, or by any other combination of modules and components.

The routine 400 begins at operation 402, where the quote extraction module 134 receives an identifier of a particular item. For example, the quote extraction module 134 may receive the item SKU 206 for an MP3 audio track listed in the item catalog data 126 for which a customer 102 has shown an interest. From operation 402, the routine 400 proceeds to operation 404, where the quote extraction module 134 retrieves customer reviews 202 from the customer review data 132 for one or more collections of items in the item catalog data 126 related to the identified item. For example, for the MP3 audio track, the quote extraction module 134 may retrieve customer reviews 202 for all albums, collections, and other items offered in the item catalog data 126 that contain or are related to the identified track.

As discussed above in regard FIG. 1, the quote extraction module 134 may utilize the item relationship data 136 to determine the collection of items(s) in the item catalog data 126 that contain the particular item. For example, the quote extraction module 134 may utilize the track to album mappings in the item relationship data 136 to find one or more albums containing the identified track, and then reference the title authority sets to determine all items available for sale in the item catalog data 126 that embody those albums. The quote extraction module 134 may then retrieve the customer reviews 202 for all the items associated with the identified track from the customer review data 132.

The routine 400 proceeds from operation 404 to operation 406, where the quote extraction module 134 parses individual sentences from the comments 212 of the retrieved customer reviews 202 to build a collection of sentences. It will be appreciated that the individual sentences contained in the comment 212 from a customer review 202 may discuss a variety of topics directly or indirectly related to the associated item. The quote extraction module 134 may parse the individual sentences from the comments 212 in order to analyze each sentence separately in the context of the entire collection of sentences. In additional embodiments, the quote extraction module 134 may further parse sub-sentences or phrases from the comments 212 of the customer reviews 202 based on grammatical constructs and/or other grammatical analysis.

From operation 406, the routine 400 proceeds to operation 408, where the quote extraction module 134 identifies those phrases or sentences in the collection of sentences that discuss the identified item. According to one embodiment, the quote extraction module 134 utilizes simple text analysis to determine if a sentence from the collection of sentences discusses the identified item. For example, in the case of sentences parsed from customer reviews of media collections containing an identified track, the quote extraction module 134 may search the collection of sentences to locate sentences containing the title of a track, the track number of the track on a particular album, or some other identifier of the identified track. In addition, the quote extraction module 134 may exclude from the located sentences those sentences that contain both the title or number of the identified track and titles and/or numbers of other tracks on the CD or album.

In another embodiment, the quote extraction module 134 analyzes the sentences in the collection of sentences to develop a list of topics discussed. The list of topics may comprise one or more topics identified across the entire collection of sentences. Each sentence in the collection of sentences is further assigned to one or more topics from the list of topics based on the analysis. The quote extraction module 134 may develop the list of topics and assign each sentence in the collection of sentences to one or more of the topics utilizing the method described in co-pending U.S. patent application Ser. No. 13/051,278, filed on Mar. 18, 2011, and entitled "Extracting Quotes from Customer Reviews" ("quote extraction application"), which is herein incorporated by this reference in its entirety. It will be appreciated that other methods known in the art may be utilized by the quote extraction module 134 to develop the list of topics from the collection of sentences and assign each sentence to one or more topics. For example, the quote extraction module 134 may utilize latent Dirichlet allocation ("LDA") to discover the abstract topics that occur in the collection sentences and assign each sentence to one or more of the topics. It is intended that this application include all such methods of analyzing the sentences in the collection of sentences.

In addition to assigning each of the sentences in the collection of sentences to one or more topics, the quote extraction module 134 may also determine a sentiment of each sentence as it relates to the assigned topic(s) or to the comments 212 as a whole. For example, the quote extraction module 134 may utilize sentiment analysis as described in the quote extraction application to determine whether the sentence expresses a positive statement as to the topic or associated item, such as "love track #1" or "one of my favorite tracks from the album," a negative statement as to the topic or item, such as "did not like track" or "disappointed with my purchase of album," or a neutral statement. It will be appreciated that other methods known in the art may be utilized by the quote extraction module 134 to determine a sentiment for the sentences in the collection of sentences, and it is intended that this application include all such methods of determining a sentiment of each sentence.

The quote extraction module 134 may then identify those topics in the list of topics that are related to the identified item. According to one embodiment, the quote extraction module 134 may utilize term frequency-inverse document frequency ("TF-IDF") and word stemming to select the most used and relevant term or sequence of terms from among the sentences assigned to each topic. The quote extraction module 134 may then utilize those topics where the most used and relevant term identifies the particular item. For example, topics where the most used and relevant term(s) comprise the title of a track, the track number of the track on a particular album, and the like may be labeled as topics related to a particular audio track.

Next, the routine proceeds from operation 408 to operation 410, where the quote extraction module 134 extracts quotes from the sentences or phrases in the collection of sentences identified as discussing the individual item. An extracted quote may comprise one or more sentences or phrases taken from the same comment 212 of a customer review 202 regarding the identified item. According to one embodiment, the quote extraction module 134 extracts as quotes those sentences that best describe or most clearly discuss the identified item. For example, using the topic analysis from the quote extraction application discussed above, the quote extraction module 134 may extract quotes from those sentences identified as most representative to the topic(s) identified as related to the individual item. In another embodiment, the quote extraction module 134 may further apply additional analysis to disambiguate topics related to the identified item and topics that relate to the collection of items as a whole, such as to differentiate the use of the track title in sentences from the title of the album when the title of the album and the title of a track on the album are the same.

The extracted sentences or quotes may be further enhanced or filtered in order to improve the quality of the extracted quotes. For example, the quote extraction module 134 may apply word-stemming to broaden the available quotes. In addition, the extracted sentences may be filtered by a minimum readability level, based on a minimum average word length and/or other method of approximating the readability of the sentence. From operation 410, the routine 400 proceeds to operation 412 where the extracted quotes are displayed to the customer 102 in conjunction with customer reviews 202 regarding the identified item, as described below in regard to FIG. 5. In one embodiment, the quote extraction module 134 may store the extracted quotes back to the customer review data 132 for later retrieval and presentation to customers 102. For example, the quote extraction module 134 may store each extracted quote as a comment 212 in a new customer review 202 related to the identified item by the item SKU 206. The quote extraction module 134 may utilize the values for the customer ID 208 and the review date 212 from the original customer review 202 from which the quote was extracted to fill the elements of the newly created customer review 202.

In addition, the quote extraction module 134 may further store the customer rating 214 and helpfulness rating 216 from the original customer review 202 and the readability level 218 determined from the quote extraction analysis for the individual quote in the newly created customer review 202. According to embodiments, the online shopping module 124 and/or other modules of the merchant system 120 may utilize these attributes in selecting customer reviews 202 related to the identified item to present to customers 102 along with the item details 128. From operation 412, the routine 400 ends.

Figure 5:
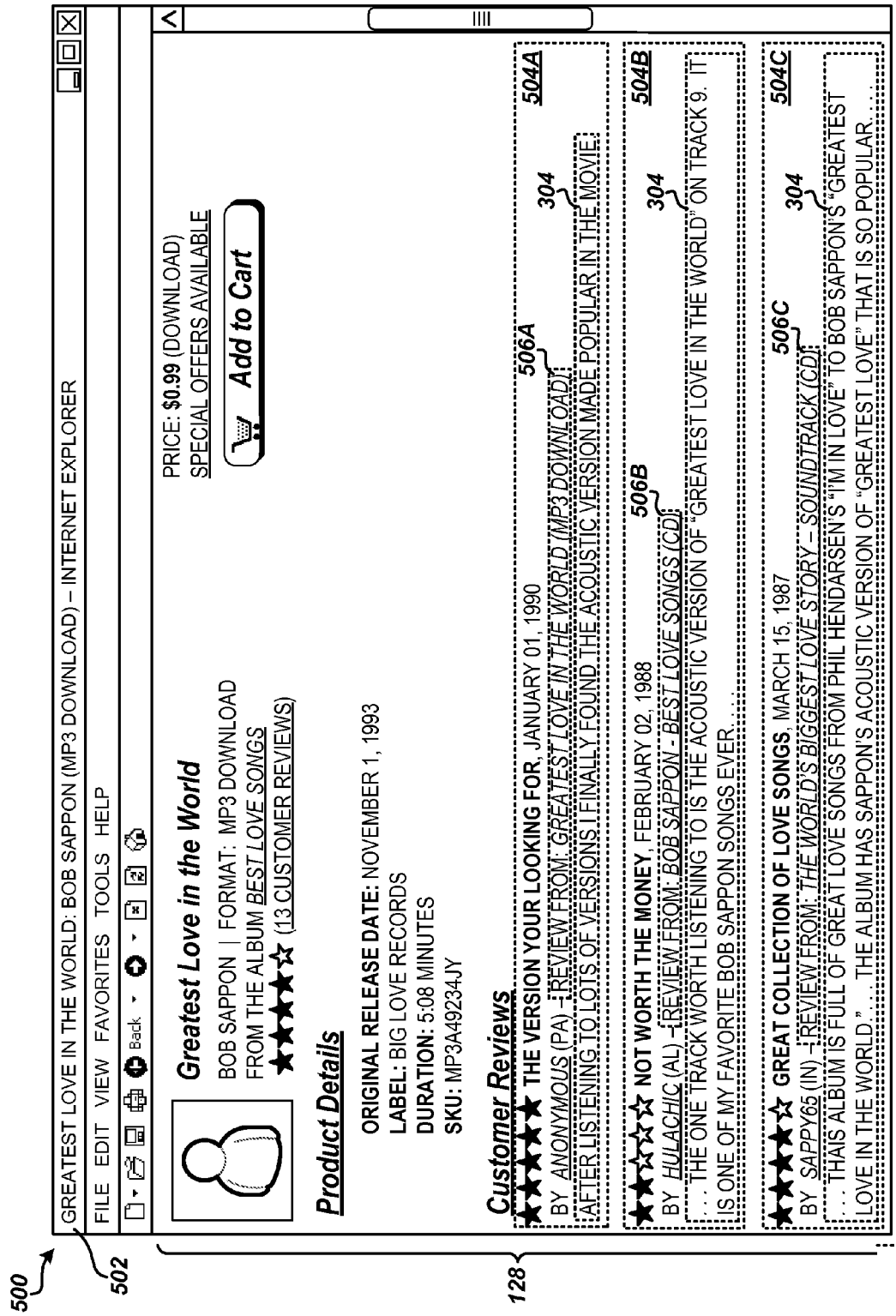
FIG. 5 is a screen diagram showing an exemplary user interface for presenting extracted quotes regarding an individual item to customers, according to embodiments presented herein.

FIG. 5 shows an illustrative user interface ("UI") 500 presented to a customer 102 at a customer computer 104 containing quotes extracted from customer reviews 202 as described above, according to one embodiment. The UI 500 may be displayed on the customer computer 104 in conjunction with the selection of a particular item, such as an MP3 audio track, for review or purchase by the customer 102. In one embodiment, the UI 500 is sent by the online shopping module 124 as a Web page to be rendered in a window 502 by the client application executing on the customer computer 104, as described above in regard to FIG. 1. The UI 500 may include the item details 128 generated by the online shopping module 124 for the selected item.

According to embodiments, the UI 500 further includes one or more customer review displays 504A-504C (referred to herein generally as customer review display 504) generated from customer reviews 202 associated with the selected item retrieved from the customer review data 132. The customer review displays 504 may include a user name or handle and/or other information related to the customer ID 208 from the customer review 202, as well as the review date 212, the customer rating 214, and the comments 212 from the customer review. In addition, the customer review display 504 may include a source indicator 506A-506C (referred to herein generally as source indicator 506) for the comment 212 displayed for the corresponding customer review 202. For example, the customer review display 504A may contain a comment 212 supplied by a customer 102 in a customer review 202 for the individual item, such as the MP3 audio track, as indicated by the source indicator 506A.

The customer review display 504B may also contain comments 212 consisting of quotes extracted by the quote extraction module 134 from a customer review 202 regarding a collection of items containing the individual item, such as a CD, as indicated by the source indicator 506B. Similarly, the customer review display 504C may contain comments 212 consisting of quotes extracted by the quote extraction module 134 from a customer review 202 regarding a different collection of items containing the individual item, as indicated by the source indicator 506C in FIG. 5. It will be appreciated that the UI 500 may contain any number of customer review displays 504 containing comments 212 from customer reviews 202 from a variety of sources.

FIG. 6 illustrates a routine 600 for extracting quotes regarding a collection of items or product set from customer reviews 202 of individual items in the collection or set, according to one embodiment described herein. For example, the routine 600 may be used to extract quotes relevant to a set of battery-operated tools from customer reviews 202 regarding the individual tools included in the set. Similarly, the routine 600 may be used to extract quotes regarding a collection of cookware from customer reviews regarding individual pans included in the collection, a box set of DVDs from customer reviews regarding an individual movie included in the set, a group of laptops from a particular manufacturer from customer reviews regarding individual laptops from the manufacturer, and the like. The routine 600 may be performed by the quote extraction module 134, as described above in regard to FIG. 1. It will be appreciated that the routine 600 may also be performed by other modules or components executing on the application servers 122 in the merchant system 120, or by any other combination of modules and components.

The routine 600 begins at operation 602, where the quote extraction module 134 receives an identifier of the collection of items. For example, the quote extraction module 134 may receive the item SKU 206 for a set of battery-operated tools listed in the item catalog data 126 for which a customer 102 has shown an interest. From operation 602, the routine 600 proceeds to operation 604, where the quote extraction module 134 retrieves customer reviews 202 from the customer review data 132 for the individual of items in the item catalog data 126 related to the identified collection of items. For example, for the battery-operated tool set described above, the quote extraction module 134 may retrieve customer reviews 202 for all the individual battery-operated tools included in the set and/or available from the manufacturer. As discussed above in regard FIG. 1, the quote extraction module 134 may utilize the item relationship data 136 to determine the individual items in the item catalog data 126 related to the collection of items.

The routine 600 proceeds from operation 604 to operation 606, where the quote extraction module 134 parses individual sentences from the comments 212 of the retrieved customer reviews 202 to build collections of sentences for each individual item, as described above in regard to operation 406. The routine 600 then proceeds to operation 608, where the quote extraction module 134 generates a list of topics discussed in the sentences parsed from the customer reviews 202 of each individual item. For example, the quote extraction module 134 may utilize the procedure described in the quote extraction application referenced above to generate a list of topics discussed in customer reviews 202 for each battery-operated tool in the tool set and assign each sentence to one of the topics. For a battery-operated drill, the list of topics may include "variable speed," "adjustable clutch," "battery life," "weight," and the like, while for a battery-operated circular saw, the list of topics may include "light," "blade guard," "kickback," "battery life," "blade size," and the like.

In another embodiment, the quote extraction module 134 also determines a majority sentiment for each topic generated in the list of topics. As described above in regard to operation 408, the quote extraction module 134 may determine a sentiment for each sentence parsed from the customer reviews 202 for an item. The quote extraction module 134 may further average the sentiments of the sentences assigned to each topic in the list of topics to determine a majority sentiment for the topic. For example, the "variable speed" and "battery life" topics for the battery-operated drill may have a majority of sentences expressing a positive sentiment, while the "adjustable clutch" and "weight" topic may have a majority sentiment of neutral or negative.

From operation 608, the routine 600 proceeds to operation 610, where the quote extraction module 134 identifies those topics that are common across all items in the collection of items. This may be done utilizing simple word matching of the topics, or by performing TF/IDF analysis, word-stemming, synonym substitution, and/or the like to identify topics in the list of topics generated for each individual item that have similar meaning For example, for the battery-operated drill and the battery-operated circular saw described above, the quote extraction module 134 may identify "battery life" as a common topic between these items. In addition, the quote extraction module 134 may further determine that the topic "weight" identified from the customer reviews 202 of the drill and the topic "light" identified from the customer reviews of the saw both relate to a common topic regarding the weight of the tools. In one embodiment, the identification of common topics may be done manually by administrative personnel of the merchant system 120.

In a further embodiment, the quote extraction module 134 may only identify a topic as common across the items in the collection of items where the sentences extracted for each item assigned to the topic express the same majority sentiment. For example, in the example described above, the quote extraction module 134 may identify the topic "battery life" discussed in the customer reviews for the battery-operated drill and the battery-operated saw if the majority sentiment of the sentences assigned to these topics for the individual items is the same, e.g. both positive or both negative. However, the quote extraction module 134 may not identify the topic "weight" discussed with a majority negative sentiment in the customer reviews for the battery-operated drill and the topic "light" discussed with a majority positive sentiment in the customer reviews for the battery-operated saw as being common because the sentiments do not match. Only selecting common topics that express the same majority sentiment across all items in the collection of items may provide additional confidence that the feature or element discussed in sentences assigned to the topic are applicable to the collection of items as a whole.

The routine 600 then proceeds from operation 610 to operation 612, where the quote extraction module 134 generates a list of topics from across the entire collection of sentences for all the individual items and assigns each sentence to one or more of the topics. Again, the quote extraction module 134 may develop the list of topics and assign each sentence in the collection of sentences to one or more of the topics utilizing the method described in the quote extraction application referenced above, or the quote extraction module may utilize some other method known in the art to develop the list of topics from the collection of sentences. In addition to assigning each of the sentences in the collection of sentences across the individual items to one or more topics, the quote extraction module 134 may also determine the sentiment expressed by each sentence as it relates to the assigned topic(s), as further described above.

Next, the routine proceeds from operation 612 to operation 614, where the quote extraction module 134 extracts the most salient quotes from the sentences or phrases in the entire collection of sentences assigned to those topics that are determined to be the same as or have similar meaning to the common topics identified in operation 610. For example, the quote extraction module 134 may extract quotes from the sentences assigned to the topic "battery life" identified as being common across all the battery-operated tools in the tool set. According to one embodiment, the quote extraction module 134 extracts as quotes those sentences that best describe or most clearly discuss the identified common topic. For example, using the topic analysis from the quote extraction application discussed above, the quote extraction module 134 may extract quotes from those sentences identified as most representative to the "battery life" topic identified above. In a further embodiment, the quote extraction module 134 may ensure that the sentences from which quotes are extracted express the same sentiment as the majority sentiment identified for the topic across the individual items in operation 610.

As described above in regard to operation 412, the extracted sentences or quotes may be further enhanced or filtered in order to improve the quality of the extracted quotes. From operation 614, the routine 600 proceeds to operation 616 where the extracted quotes are displayed to the customer 102 in conjunction with customer reviews 202 regarding the collection of items. For example, the extracted quotes may be displayed to the customer through a UI 500 such as that described above in regard to FIG. 5. As further discussed above, the quote extraction module 134 may store the extracted quotes back to the customer review data 132 for later retrieval and presentation to customers 102. From operation 616, the routine 600 ends.

In an alternative embodiment, the quote extraction module 134 uses a simpler approach than that described above in regard to operations 608 through 614 to identify topics discussed in the collection of sentences parsed from the individual items that are relevant to the collection or product set. The quote extraction module 134 utilizes the method described in the quote extraction application to generate a list of topics from across the entire collection of sentences for all the individual items in the collection of items or product set and assigns each sentence to one or more of the topics. The quote extraction module 134 may further limit the generated topics to those in which the assigned sentences expressed a clear majority sentiment, positive or negative.

From this list of topics, the quote extraction module 134 may select a number of the most discussed topics, e.g. the topics with the most assigned sentences, from which to extract quotes regarding the collection of items. It may be assumed that if a topic, such as "battery life," is discussed frequently across all the customer reviews for the individual items in the collection or product set, that topic will likely be of interest to a purchaser of the collection or product set. The quote extraction module 134 may select a specific number, such as three, of the most discussed topics, or the selected most discussed topics may be determined based on some threshold criteria for the topics, such as topics that are discussed in at least X % of the sentences across all the individual items, topics that are discussed in at least Y % of the sentences for each individual item, topics where the assigned sentences express some minimum threshold level of majority sentiment, and the like. Next, the quote extraction module 134 utilizes the topic analysis from the quote extraction application to extract the most salient quotes from the sentences or phrases in the entire collection of sentences assigned to the selected most discussed topics. As described above, the most salient quotes may include those sentences determined to be most representative of the topic and that express the majority sentiment determined for the topic.

While the examples described above relate to extracting quotes relevant to a collection of items or product set from customer reviews 202 of the individual items in the collection or set, the same routine 600 could also be used to extract quotes relevant to a category of items of a particular brand or from a particular manufacturer from customer reviews of individual items in the category and of the brand. For example, the routine 600 could be utilized to extract quotes determined to be relevant to all Brand-X laptop computers from the customer reviews of individual Brand-X laptops in the customer review data 132, or all cookware from manufacturer Y from the customer reviews of individual cookware items from that manufacturer. It will be appreciated that the routine 600 may be utilized to extract quotes based on other relationships between individual items and groups of items, and it is intended that all such relationships be included in this application.

In a further embodiment, the quote extraction module 134 may use simple text analysis to identify topics discussed in the collection of sentences parsed from the individual items that may be relevant to the collection of items or product set. For example, the quote extraction module 134 may simply look for common words that occur in the comments 212 of the customer reviews 202 across all the battery-operated tools in the set of tools, such as "battery," and assume that all of the located sentences refer to the same topic of battery life, which may be relevant to the set. In another example, the quote extraction module 134 may look for the name of the collection or product set, or the brand name in the comments 212 of the customer reviews 202 to determine those sentences from which to extract quotes that may be relevant to the collection or group as a whole. According to another embodiment, the quote extraction module 134 may periodically search the comments 212 of new customer reviews 202 in the customer review data 132 in order to extract quotes regarding collections of items, as described above in regard to FIGS. 4 and 6.

Figure 7:
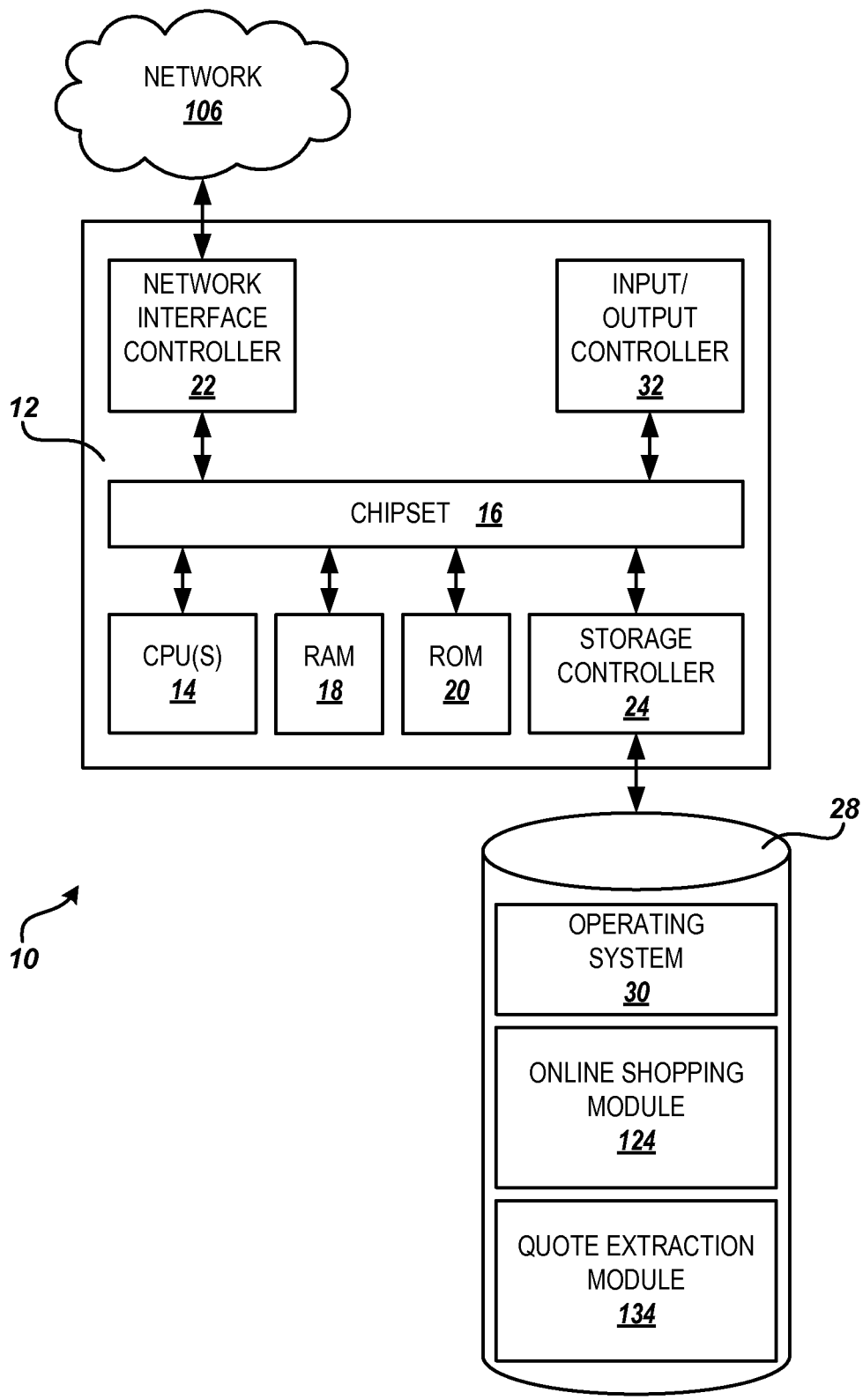
FIG. 7 is a computer architecture diagram showing an illustrative computer hardware architecture for computing devices described in embodiments presented herein.

FIG. 7 shows an example computer architecture 10 for a computer 12 capable of executing the software components described herein for extracting quotes from customer reviews regarding collections of items, in the manner presented above. The computer architecture 10 shown in FIG. 7 illustrates a conventional server computer, workstation, desktop computer, laptop, PDA, electronic book reader, digital wireless phone, network appliance, set-top box, or other computing device, and may be utilized to execute any aspects of the software components presented herein described as executing on the application servers 122, the customer computer 104, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as other application servers 122, the customer computer 104, a data storage system in the merchant system 120, and like, over the network 106 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description.

Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the online shopping module 124 and/or the quote extraction module 134, both of which were described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 400 and 600 for extracting quotes from customer reviews regarding collections of items, as described above in regard to FIGS. 4 and 6.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 7, may include other components that are not explicitly shown in FIG. 7, or may utilize an architecture completely different than that shown in FIG. 7.

Based on the foregoing, it should be appreciated that technologies for extracting quotes from customer reviews regarding collections of items are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
   receive an identifier of a collection of items;
   determine individual items belonging to the collection of items using item relationship data specifying relationships between the individual items and the collection of items;
   retrieve customer reviews regarding the individual items;
   parse a plurality of sentences from the customer reviews;
   generate a list of topics for each of the individual items from the plurality of sentences;
   identify one or more common topics from the list of topics of each of the individual items;
   generate an overall list of topics discussed across all of the individual items from the plurality of sentences and assign each sentence in the plurality of sentences to one or more topics in the overall list of topics;
   extract one or more quotes from the sentences assigned to topics matching the one or more common topics; and
   display the one or more quotes to a customer in conjunction with information regarding the collection of items.

2. The computer-readable storage medium of claim 1, having further computer-executable instructions stored thereon that cause the computer to:
   determine a sentiment expressed by each sentence in the plurality of sentences;
   determine a majority sentiment for each topic in the list of topics of each of the individual items;

identify the one or more common topics from the list of topics of each of the individual items wherein the majority sentiment for the topic is the same across all of the individual items; and extract the one or more quotes from the sentences assigned to topics matching the one or more common topics and expressing the majority sentiment for the topic.

3. The computer-readable storage medium of claim 1, wherein the collection of items comprises a product set including the individual items and sold as a unit.

4. The computer-readable storage medium of claim 1, wherein the collection of items comprises items of a particular brand and product category and the individual items comprise all items of the particular brand and product category.

5. The computer-readable storage medium of claim 1, having further computer-executable instructions stored thereon that cause the computer to store the one or more extracted quotes in customer review data as customer reviews regarding the collection of items.

6. A computer-implemented method of extracting quotes from customer reviews of a collection of items to provide salient comments regarding an individual item contained in the collection, the method comprising executing instructions in a computer system to perform the operations of:

receiving an identifier of the individual item;

determining the collection of items containing the individual item using item relationship data specifying relationship between the individual item and the collection of items;

retrieving, by a computing device, customer reviews regarding the collection of items containing the individual item;

parsing, by the computing device, a plurality of sentences from the customer reviews;

identifying, by the computing device, sentences in the plurality of sentences that discuss the individual item;

extracting, by the computing device, a quote from the identified sentences; and displaying the extracted quote to a customer in conjunction with information regarding the individual item.

7. The computer-implemented method of claim 6, wherein identifying the sentences in the plurality of sentences that discuss the individual item comprises searching the plurality of sentences for sentences that contain a name, number, or other identifier of the individual item.

8. The computer-implemented method of claim 6, further executing instructions in the computer system to perform the operations of:

generating a list of topics for the plurality of sentences;

assigning each sentence in the plurality of sentences to one or more topics in the list of topics;

identifying one or more topics in the list of topics related to the individual item; and extracting the quote from the sentences assigned to the one or more topics identified as related to the individual item.

9. The computer-implemented method of claim 8, wherein generating the list of topics for the plurality of sentences and assigning sentences in the plurality of sentences to one or more topics in the list of topics comprises discovering the list of topics from the plurality of sentences and assigning the sentences to the topics utilizing latent Dirichlet allocation.

10. The computer-implemented method of claim 6, wherein the extracted quote is stored in customer review data as a customer review regarding the individual item.

11. The computer-implemented method of claim 6, wherein the extracted quote is displayed to the customer with a source indicator indicating an original customer review regarding the collection of items from which the quote was extracted.

12. The computer-implemented method of claim 6, wherein the collection of items comprises an album and the individual item comprises a track on the album.

13. A system for extracting quotes related to a collection of items from customer reviews of individual items in the collection, the system comprising:

a merchant system comprising one or more application servers;

a quote extraction module executing on the one or more application servers and configured to receive an identifier of the collection of items, determine the individual items belonging to the collection of items using item relationship data specifying relationships between the individual items and the collection of items, retrieve customer reviews regarding the individual items, parse a plurality of sentences from the customer reviews, identify sentences in the plurality of sentences that discuss the collection of items, and extract one or more quotes from the identified sentences; and an online shopping module executing on the one or more application servers and configured to display the one or more quotes to a customer in conjunction with information regarding the collection of items.

14. The system of claim 13, wherein identifying the sentences in the plurality of sentences that discuss the collection of items comprises searching the plurality of sentences for sentences that contain a name or other identifier of the collection of items.

15. The system of claim 13, wherein the quote extraction module is further configured to:

generate a list of topics for each of the individual items from the plurality of sentences;

identify one or more common topics from the list of topics of each of the individual items;

generate an overall list of topics discussed across all of the individual items from the plurality of sentences and assign each sentence in the plurality of sentences to one or more topics in the overall list of topics; and extract the one or more quotes from the sentences assigned to topics matching the one or more common topics.

16. The system of claim 15, wherein the quote extraction module is further configured to:

determine a sentiment expressed by each sentence in the plurality of sentences;

determine a majority sentiment for each topic in the list of topics of each of the individual items;

identify the one or more common topics from the list of topics of each of the individual items wherein the majority sentiment for the topic is the same across all of the individual items; and extract the one or more quotes from the sentences assigned to topics matching the one or more common topics and expressing the majority sentiment for the topic.

17. The system of claim 15, wherein identifying one or more common topics from the list of topics of each of the individual items comprises utilizing term-frequency/inverse document-frequency analysis to identify topics in the list of topics of each of the individual items that have similar meaning.

18. The system of claim 15, wherein generating the overall list of topics discussed across all of the individual items from the plurality of sentences and assigning each sentence in the plurality of sentences to one or more topics in the overall list of topics comprises discovering the overall list of topics from the plurality of sentences and assigning the sentences to the topics utilizing latent Dirichlet allocation.

19. The system of claim 13, wherein the quote extraction module is further configured to:
- generate a list of topics discussed across all of the individual items from the plurality of sentences and assign each sentence in the plurality of sentences to one or more topics in the list of topics;
- select one or more most discussed topics from the list of topics; and
- extract the one or more quotes from the sentences that are most salient to the one or more most discussed topics.

20. The system of claim 13, wherein the quote extraction module is further configured to store the one or more extracted quotes in customer review data as customer reviews regarding the collection of items.

21. The system of claim 13, wherein the collection of items comprises a product set including the individual items and sold as a unit.

22. The system of claim 13, wherein the collection of items comprises items of a particular brand and product category and the individual items comprise all items of the particular brand and the product category.

* * * * *